United States Patent
Yadavalli et al.

(10) Patent No.: US 7,168,010 B2
(45) Date of Patent: Jan. 23, 2007

(54) VARIOUS METHODS AND APPARATUSES TO TRACK FAILING MEMORY LOCATIONS TO ENABLE IMPLEMENTATIONS FOR INVALIDATING REPEATEDLY FAILING MEMORY LOCATIONS

(75) Inventors: Sitaram Yadavalli, San Jose, CA (US); Tracy Garrett Drysdale, Chandler, AZ (US); Husnara Khan, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 573 days.

(21) Appl. No.: 10/217,984

(22) Filed: Aug. 12, 2002

(65) Prior Publication Data

US 2004/0030957 A1    Feb. 12, 2004

(51) Int. Cl.
*G06F 11/00* (2006.01)
(52) U.S. Cl. .......................... 714/42; 714/54; 714/710; 714/711; 714/723
(58) Field of Classification Search .......... 714/30, 714/54, 49, 42
See application file for complete search history.

(56) References Cited

U.S. PATENT DOCUMENTS

| | | | |
|---|---|---|---|
| 6,085,334 A * | 7/2000 | Giles et al. ............... 714/7 |
| 6,282,617 B1 | 8/2001 | Tirumala et al. | |
| 6,370,622 B1 | 4/2002 | Chiou et al. | |
| 6,467,048 B1 * | 10/2002 | Olarig et al. .............. 714/7 |
| 6,496,538 B1 | 12/2002 | Drysdale | |
| 6,505,305 B1 * | 1/2003 | Olarig ...................... 714/5 |
| 6,691,252 B1 * | 2/2004 | Hughes et al. ............ 714/30 |
| 2003/0204782 A1 * | 10/2003 | Schutt et al. ............ 714/30 |

OTHER PUBLICATIONS

Alan Jay Smith, "Cache Memory Design: An Evolving Art", IEEE Spectrum, Dec. 1987, pp. 40-44.
"LRU Replacement Policy", http://cne.gmu.edu/modules/vm/yellow/lru.html, Jan. 30, 2002, pp. 2 total.
"Replacement Policies", http://cne.gmu.edu/modules/vm/yellow/repol.html, Jan. 30, 2002, pp. 2 total.
David A. Patterson et al., "Computer Organization and Design, The Hardware/Software Interface", Second Edition, Morgan Kaufmann Publishers, Inc., San Francisco, California, 1998, pp. 538-579.

* cited by examiner

*Primary Examiner*—Robert Beausoliel
*Assistant Examiner*—Yolanda L Wilson
(74) *Attorney, Agent, or Firm*—Blakely, Sokoloff, Taylor & Zafman LLP (57) ABSTRACT

Various methods, apparatuses, and systems that use a replacement policy algorithm to implement tracking of one or more memory locations that have incurred one or more data transfer failures.

18 Claims, 7 Drawing Sheets

Employ the replacement policy to remove entries from the buffer under various circumstances such as when the limited amount of tracked memory locations exceeds the finite amount of entries allowed in the tracking buffer. The replacement policy, such as a least recently failed policy, replaces one of the previously stored/tracked memory locations in the tracking buffer with current memory location that caused the tracking buffer to exceed its finite amount of entries.
212

Remove a particular memory location's entries from the tracking buffer based a number of conditions such as a comparison determining that the total number of tracked memory locations exceeds the finite number of entries allowed in the buffer tracking this information, or the tracked memory location has incurred a threshold number of failures to be identified as a candidate for invalidation. 214

In an embodiment, the Least Recently Failed policy is used to select the tracked memory location to be replaced in the buffer to correspond to the memory location that had a failure least recently chronologically among failed memory locations associated with all existing entries in the buffer with a new entry for the memory location that most recently resulted in the failure. Other factors may also be considered such as selecting the memory location entry to be replaced by weighting the tracked memory locations by the number of failures recorded for each memory location and/or by weighting the tracked memory locations by failure rate for each memory location.
216

End

Figure 3

Exemplary tracking buffer having a finite size of three entries and a threshold of four failures prior to being designated as an invalid memory location

| Chronological Failing order of memory locations | Least recently failed tracked memory location | | Most recently failed tracked memory location |
|---|---|---|---|
| 1 | - | - | 1 |
| 2 | - | 1 | 2 |
| 3 | 1 | 2 | 3 |
| 2 | 1 | 3 | $2_2$ |
| 1 | 3 | $2_2$ | $1_2$ |
| 2 | 3 | $1_2$ | $2_3$ |
| 4 | $1_2$ | $2_3$ | 4 (3) was LRF |
| 5 | $2_3$ | 4 | 5 |
| 2 | 4 | 5 | * remove $2_4$ as invalid |
| 1 | 4 | 5 | 1 |

Identification and removal based on chronological order of least recent failure for that memory location and total number of failures recorded for that memory location.

Figure 4

Exemplary tracking buffer having a finite size of three
entries and a threshold of four failures prior to being
designated as an invalid memory location

| Chronological Failing order of memory locations | Least recently failed tracked memory location 506 | 510 | Most recently failed tracked memory location 512 |
|---|---|---|---|
| 1 | - | - | 1 |
| 2 | - | 1 | 2 |
| 3 | 1 | 2 | 3 |
| 2 | 1 | 3 | $2_2$ |
| 1 | 3 | $2_2$ | $1_2$ |
| 2 | 3 | $1_2$ | $2_3$ |
| 4 | $1_2$ | $2_3$ | 4 (3) was LRF |
| 5 | $1_2$ | $2_3$ | 5 (4) least weighted |
| 2 | $1_2$ | 5 | * remove $2_4$ as invalid |
| 1 | 5 | $1_3$ | - |

502

Identification and removal based on chronological order of least
recent failure for that memory location, weighted by the number
of failures recorded for that memory location, and total number
of failures recorded for that memory location.

Figure 5

Exemplary buffer size of three entries and a threshold of, five failures or an occurrence rate of 4 failures per month, prior to being designated as an invalid memory location

| Chronological Failing order of memory locations | Least recently failed tracked memory location | | Most recently failed tracked memory location |
|---|---|---|---|
| $1_{1\text{-}01\text{-}02}$ | - | - | $1_{1\text{-}01\text{-}02}$ |
| $2_{2\text{-}24\text{-}02}$ | - | $1_{1\text{-}01\text{-}02}$ | $2_{2\text{-}14\text{-}02}$ |
| $3_{3\text{-}01\text{-}02}$ | $1_{1\text{-}01\text{-}02}$ | $2_{2\text{-}24\text{-}02}$ | $3_{3\text{-}01\text{-}02}$ |
| $2_{3\text{-}14\text{-}02}$ | $1_{1\text{-}01\text{-}02}$ | $3_{3\text{-}01\text{-}02}$ | $2_{2\text{-}24\text{-}02,\ 3\text{-}14\text{-}02}$ |
| $1_{3\text{-}15\text{-}02}$ | $3_{3\text{-}01\text{-}02}$ | $2_{2\text{-}24\text{-}02,\ 3\text{-}14\text{-}02}$ | $1_{1\text{-}01\text{-}02,\ 3\text{-}15\text{-}02}$ |
| $2_{3\text{-}16\text{-}02}$ | $3_{3\text{-}01\text{-}02}$ | $1_{1\text{-}01\text{-}02,\ 3\text{-}15\text{-}02}$ | $2_{2\text{-}24\text{-}02,\ 3\text{-}14\text{-}02,\ 3\text{-}16\text{-}02}$ |
| $4_{3\text{-}19\text{-}02}$ | $1_{1\text{-}01\text{-}02,\ 3\text{-}15\text{-}02}$ | $2_{2\text{-}24\text{-}02,\ 3\text{-}14\text{-}02,\ 3\text{-}16\text{-}02}$ | $4_{3\text{-}19\text{-}02}$ (3) was LRF |
| $5_{3\text{-}22\text{-}02}$ | $1_{1\text{-}01\text{-}02,\ 3\text{-}15\text{-}02}$ | $2_{2\text{-}24\text{-}02,\ 3\text{-}14\text{-}02,\ 3\text{-}16\text{-}02}$ | $5_{3\text{-}22\text{-}02}$ (4) least weighted |
| $2_{3\text{-}23\text{-}02}$ | $1_{1\text{-}01\text{-}02,\ 3\text{-}15\text{-}02}$ | $5_{3\text{-}22\text{-}02}$ | • remove $2_4$ as<br>• invalid due to rate |
| $1_{3\text{-}29\text{-}02}$ | $5_{3\text{-}22\text{-}02}$ | $1_{1\text{-}01\text{-}02,\ 3\text{-}15\text{-}02,\ 3\text{-}29\text{-}02}$ | - |

Identification and removal based on chronological order of least recent failure for that memory location, weighted by the number of failures recorded for that memory location, total number of failures recorded for that memory location, and failure rate for that memory location.

Figure 6

Figure 7

VARIOUS METHODS AND APPARATUSES TO TRACK FAILING MEMORY LOCATIONS TO ENABLE IMPLEMENTATIONS FOR INVALIDATING REPEATEDLY FAILING MEMORY LOCATIONS

FIELD

Various embodiments of the invention generally relate to ensuring the integrity of a memory location. More particularly, one or more embodiments of the invention use a replacement policy algorithm to track one or more memory locations that have incurred one or more data transfer failures.

BACKGROUND

A Built In Self Test (BIST), such as Power On Self Test, identifies defective memory words in a magnetic disk-drive or a semiconductor memory that fail the fault thresholds of the BIST test. Generally, after the completion of the BIST, two results are possible. The BIST declares the memory word useable without any limitations or BIST permanently invalidates or disables the memory word. Thus, bad sectors on the magnetic disk drive are permanently invalidated or disabled and the bad sector information is typically communicated to a user during the BOOT process of a computer.

However, if the amount of errors detected with particular memory word does not exceed the fault thresholds programmed in the BIST test, then the memory word having potential defects continues to be used. Thus, a memory word that possesses a persistent hardware fault that repeatedly causes errors but at an infrequent interval may be tolerated and degrades the data integrity for the system.

Similarly, cache lines that fail during operation outside of a test facility are typically not tracked or monitored in any way. A cache line with a persistent failure will degrade the data integrity of the system and may crash or shutdown the system. However, typically neither cache lines nor memory words are tracked to determine if an error at that location is found to be repetitive, and thus, indicate hard-defects that need to be eliminated.

Another prior technology is the Least Recently Used replacement policy implemented to replace data stored in a cache. A processing unit associated with a cache may use a Least Recently Used replacement algorithm to store the most recently used data in the cache while discarding the oldest data. A rule based algorithm is used in the cache system that selects a cache line to be flushed if the cache line has been used, such as read or written to, less recently than any other cache line. During a flush the modified data stored in the cache line that belongs to a first transaction is written out to main memory so that a second transaction can use the cache line. Thus, a replacement algorithm determines which entry in an associative cache to flush to main memory when it is desired to cache a new block of data. The "least recently used" algorithm flushes the block that has not been accessed for the longest time.

BRIEF DESCRIPTION OF THE DRAWINGS

The drawings refer to embodiments of the invention in which:

FIGS. 2 and 3 illustrate a flow diagram of an embodiment of an exemplary replacement policy algorithm to identify a memory location candidate for invalidation;

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific replacement algorithms, named components, connections, types of memory locations, etc, in order to provide a thorough understanding of the present invention. It will be apparent, however, to one skilled in the art that embodiments of the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

In general, various methods, apparatuses, and systems are described that use a replacement policy algorithm to implement tracking of one or more memory locations that have passed a Built in Self Test however during a subsequent operation have had at least one or more data transfer failures.

Figure 1:
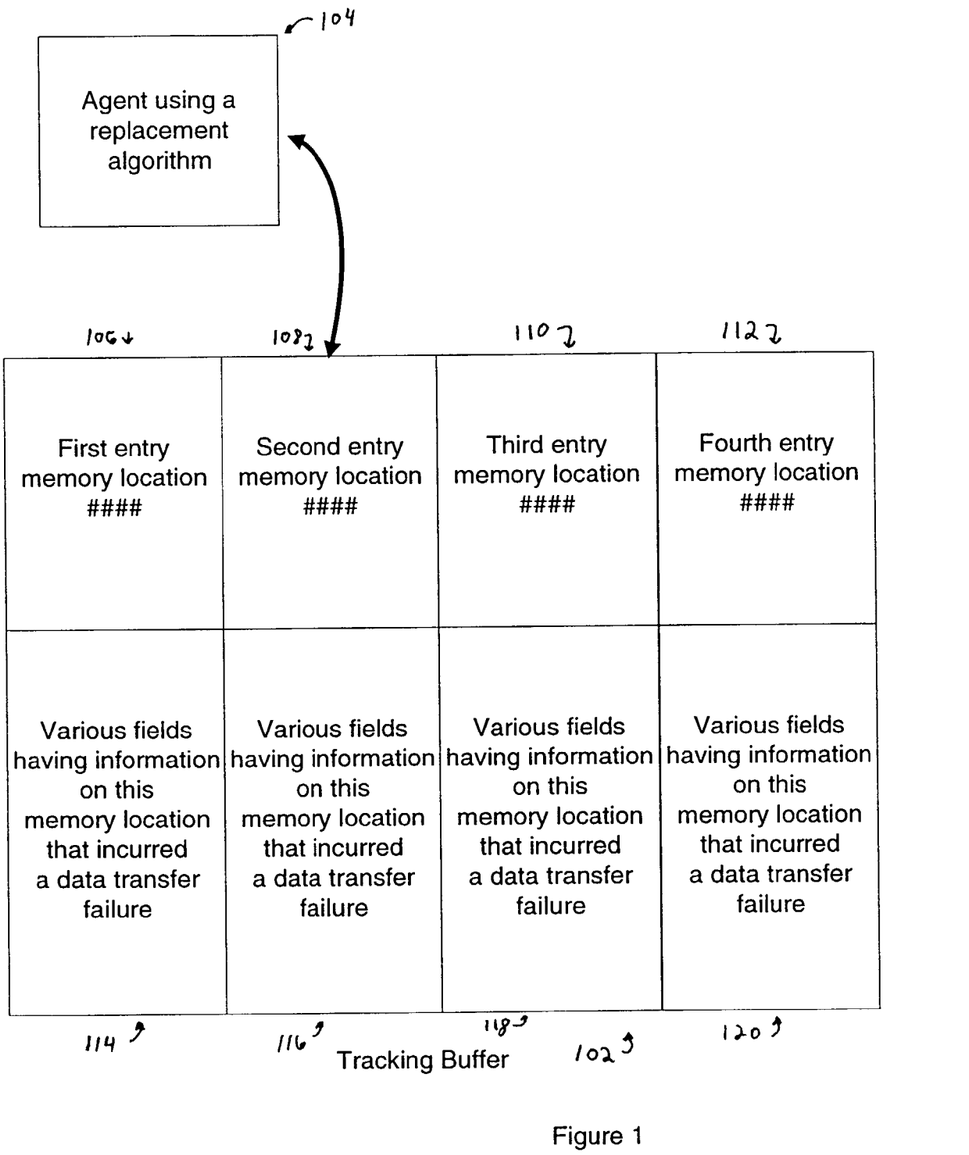
FIG. 1 illustrates a block diagram of an embodiment of a tracking buffer that stores information to track memory locations that incur failed data transfer operations in order to cooperate with an agent using one or more replacement policies to track and invalidate the memory locations that incur failed data transfer operations.

FIG. 1 illustrates a block diagram of an embodiment of a tracking buffer that stores information to track memory locations that incur failed data transfer operations in order to cooperate with an agent using one or more replacement policies to track and invalidate the memory locations that incur repeated data transfer failures. The tracking buffer 102 cooperates with an agent 104 employing a replacement algorithm to identify one or more memory location candidates for invalidation. The agent 104 may be logic that implements the replacement algorithm such as a processing unit, a CPU, an application specific integrated circuit, software logic, or hardware logic.

The tracking buffer 102 has multiple entries such as a first entry 106, a second entry 108, a third entry 110, and a fourth entry 112. Each entry 106–112 tracks one or more memory locations indicated to have failed by an error checking mechanism. Each entry 106–112 contains one or more fields 114–120. Each field 114–120 contains information associated with the one or more memory locations indicated to have failed by the error checking mechanism. The agent 104 uses a replacement policy algorithm and cooperates with the buffer 102 to implement tracking of the one or more memory locations.

The tracking buffer 102 has a finite amount storage to store information regarding memory locations, such as a cache line or memory word, that incur a failed data transfer operation. The information about each failing memory location can be held in the finite sized buffer 102 in a memory anywhere inside the system including the CPU, chipset, main memory, etc. The memory could be volatile memory such as a D-RAM or a Static RAM or could be non-volatile memory such as FLASH memory, magnetic storage or any other form of memory that can survive a power shut down. In an embodiment, the tracking buffer 102 has one or more entries 106–112 associated with each memory location. As noted above, in an embodiment, the tracking buffer 102 has one or more memory locations associated with each entry 106–112. Each memory location is being tracked by an entry 106–112 because the memory location from which the stored data that was read or written to during a data transfer operation was detected to be incorrect by the error detecting mechanism. As described more below, a data transfer failure results from incorrect data detected during a read or a write operation and includes a failed read-access operation.

The tracking buffer 102 in the entry and fields contains information about a faulty memory location such as a pointer to the memory location's address, the size of the failing memory word or cache line, and/or the number of times the memory location was detected failed during one or more instances of operation. The tracking buffer 102 may also contain additional information like the number of times the memory location was corrected, the set and way information if applicable, the sector or track information if applicable, as well as the bank, column or row information, if applicable. The fields 114–120 associated with the memory location could also include the date and time of failure, the value of the time interval between the memory location's previous failure and latest failure, the number of times the memory location failed in a specific period of time, or a given unit of time and the threshold number of times the failure could be corrected by the correcting mechanism prior to being designated an invalid memory location, or other similar information.

The tracking buffer 102 stores the information on a memory location that incurred a failed data transfer operation until that memory location is designated permanently invalid or removed from being tracked. Depending on the replacement policy used for tracking, some pieces of information can be omitted. In an embodiment, for efficiency reasons, the tracking buffer 102 may hold information on a finite amount of entries 106–112, and thus limited amount of tracked memory locations. However, in an embodiment, the space available in the buffer 102 for any new entries can be increased or reduced as deemed fit.

The tracking buffer 102 monitors a finite amount of memory locations that have incurred a data transfer failure in order to identify a candidate for invalidation of that memory location. Invalidation includes the permanent or temporary disabling of a memory location for data storage or retrieval use for a regime of operation. In an embodiment, the tracking buffer 102 may or may not store the failure analysis results from a Built-In Self-Test; however, in either case, memory locations being tracked by the tracking buffer 102 have already passed the first Built in Self Test. Otherwise, a memory location that fails BIST—is typically automatically invalidated for at least a regime of operation. Note, in some regimes of operation, BIST may be applied many times to check the integrity of the memory. The tracking buffer 102 may continue to track the cumulative number of failures that each memory location has incurred.

Figure 2:
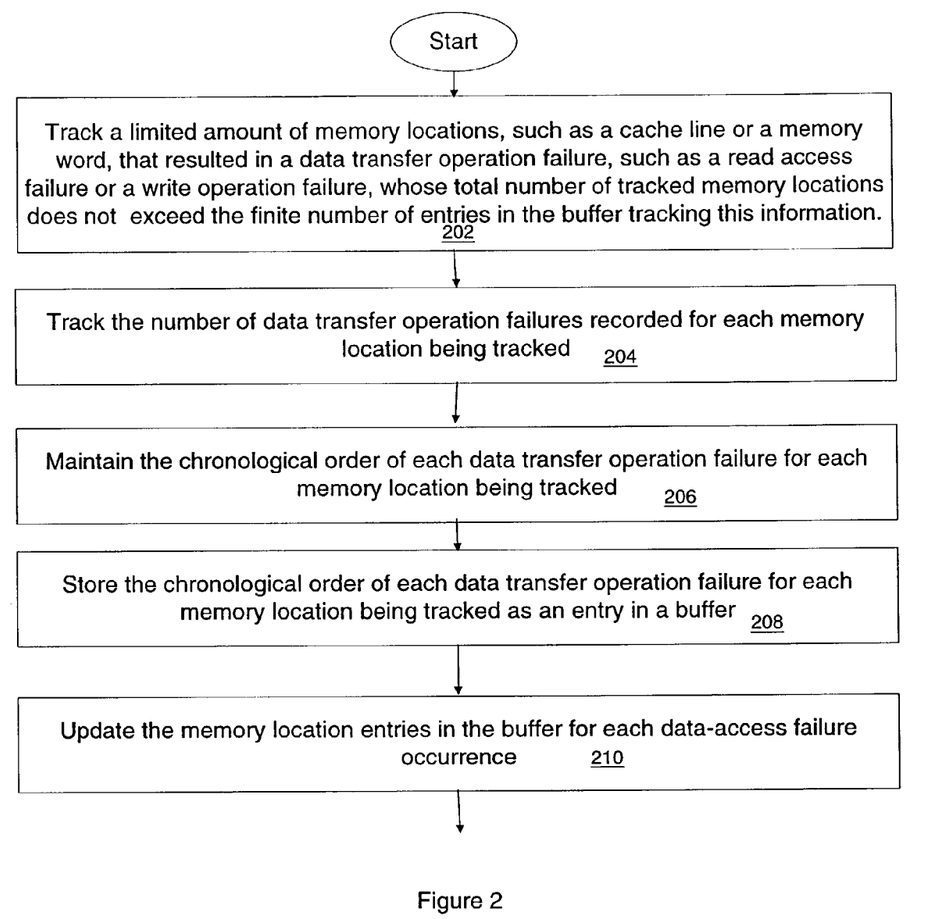

FIGS. 2 and 3 illustrate a flow diagram of an embodiment of an exemplary replacement policy algorithm to identify a memory location candidate for invalidation.

In block 202, the agent executes the algorithm to cooperate with the tracking buffer to track a limited amount of memory locations, such as a cache line or a memory word, whose total number of tracked memory locations does not exceed the finite number of entries in the buffer tracking this information. Each tracked memory location has incurred one or more data transfer failures indicated to have failed by an error checking mechanism.

In block 204, the agent executes the algorithm to direct the number of data transfer operation failures recorded for each memory location being tracked to be stored. In an embodiment, the tracking buffer stores this information.

In block 206, the agent executes the algorithm to direct the tracking buffer to maintain the chronological order of each data transfer operation failure for each memory location being tracked. In an embodiment, the buffer may use a first-in first-out scheme to maintain chronological order. In an embodiment, the fields associated with each entry for a data transfer failure may contain the address information for a failure as well as the actual data on when that failure occurred.

In block 208, the algorithm directs the tracking buffer to store the chronological order of each data transfer operation failure for each memory location being tracked as an entry in a buffer.

In block 210, the agent executes the algorithm to update the memory location entries in the buffer after each failure occurrence.

In block 212, the agent employs the replacement policy to remove entries from the buffer under various circumstances such as when the limited amount of tracked memory locations exceeds the finite amount of entries allowed in the tracking buffer. The replacement policy, such as a least recently failed policy, replaces one of the previously stored/tracked memory locations in the tracking buffer with current memory location that caused the tracking buffer to exceed its finite amount of entries. In an embodiment, the agent may include a comparator to determine when the number of recorded failures equals or exceeds a threshold.

In block 214, the agent executes the algorithm to direct the tracking buffer to remove a particular memory location's entries from the tracking buffer based a number of conditions. For example, some of the removal from tracking conditions may be a comparison determining that the total number of tracked memory locations exceeds the finite number of entries allowed in the buffer tracking this information, the tracked memory location has incurred a threshold total number of failures to be identified as a candidate for invalidation, the tracked memory location has exceeded a threshold failure rate, or some other similar condition.

In block 216, in an embodiment, the agent uses a Least Recently Failed policy to replace the entry in the tracking buffer corresponding to the memory location that had a failure least recently chronologically among failed memory locations associated with all existing entries in the buffer with a new entry for the memory location that most recently resulted in the failure. The replacement policy may also consider other factors such as selecting the memory location entry to be replaced by weighting the tracked memory locations by the number of failures recorded for each memory location and/or by weighting the tracked memory locations by failure rate for each memory location. In an embodiment, the algorithm may be programmed for another replacement policy such as a first-in-first-out policy, a last-in-first-out-policy, a least-frequently-used-policy, or another similar policy.

Referring to FIG. 1, the agent 104 employs a replacement policy to track memory locations that have resulted in at least one failure but have not yet been designated invalid. The failure could have been a temporary one due to any possible mechanism known or unknown. One instance of such a failure is a Soft-Error that may have occurred. Equally likely, the failure could be a permanent defect also called a Hard Failure caused by any possible process or mechanisms which can include, physical, chemical, mechanical, electrical, thermal or some unknown defect-causing mechanisms. If an error occurs frequently in a memory location, then the error is symptomatic of an unreliable circuit or layout design and can be classified as a hard failure.

The failure (temporary, intermittent, repetitive or permanent) manifests itself in the form of an incorrect data read from that memory location prior to any correction mechanisms applied on the data, like ECC (Error Correcting Code) based correction. The erroneous data could have single, double or multiple bit-errors. The nature of the error or the scheme for detecting any error in a cache line or a memory word may be virtually any type. The agent 104 cooperates with the mechanism for detecting and flagging a memory location that results in incorrect data at the output after a data operation. Simple parity or ECC based error detection mechanisms are sufficient to satisfy the above criterion. Thus, any sampling of the data values stored in a memory location with a well-defined expected outcome may be considered a Read operation or a Read-access. This could include generation of write-back or snoop data, data for execution or any form of electrical or electro-optical probing, etc. Any data result that deviates from the expected outcome is considered a data transfer failure.

In an embodiment, the term, "data transfer failure" also includes failures that occur during Write operations to cache lines or memory words that are detected or corrected prior to the modification of data to those memory locations. Such failures may be sensed upon a Read from the array or even during the original Write operation by mechanisms such as parity or any other error detection scheme that is applied to the incoming data to the array.

Once the error detection mechanism flags a memory location as erroneous, the tracking buffer 102 tracks the memory location for the duration of current operation of the system, a CPU, a memory etc. As noted above, the memory location may be disabled for all future operation regimes, which start with a new reset or boot-up including a new power-on. Once invalidated for that instance/regime of operation or permanently disabled for all future instances/regimes of operation, which may be deemed to occur after a power-down and a power-on, the invalidated memory location is not used to store any valid data. Thus, the tracking buffer 102 may start monitoring fresh for every single instance of operation or can be used over multiple instances of operation which are demarcated by power-shut down for the CPU or system or cache or memory (as the case may be) and subsequent power-up.

A Built-In-Self-Test (BIST) for the memory that contains the memory locations typically occurs at the beginning a regime of operation. The BIST typically sends data to be written and read multiple times to every memory location in order to test the integrity of the memory and access mechanisms for the memory. The BIST may employ a March Memory test to test the integrity of the memory locations of any system, monitoring the hit, miss latencies and the failures. In general, a memory location must incur several failures during BIST in order to balance eliminating memory locations with hard defects and memory location that incur a failure due an erroneous reason such as a soft error.

Several exemplary algorithms for tracking failing memory locations to identify good candidates for invalidation follow.

Figure 4:
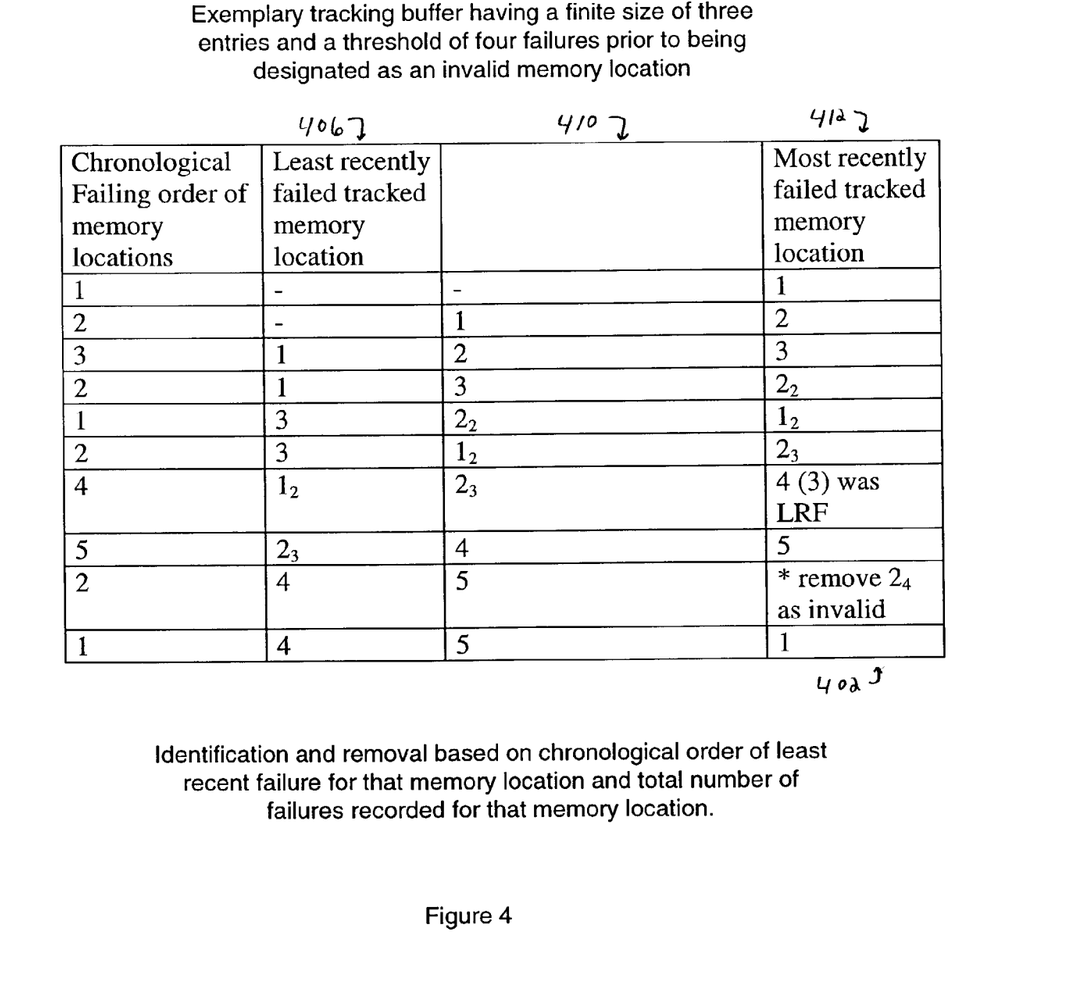
FIG. 4 illustrates a diagram of an exemplary tracking buffer cooperating with an agent using an exemplary Least Recently Failed replacement policy to identify a memory location candidate for invalidation of that memory location.
Figure 5:
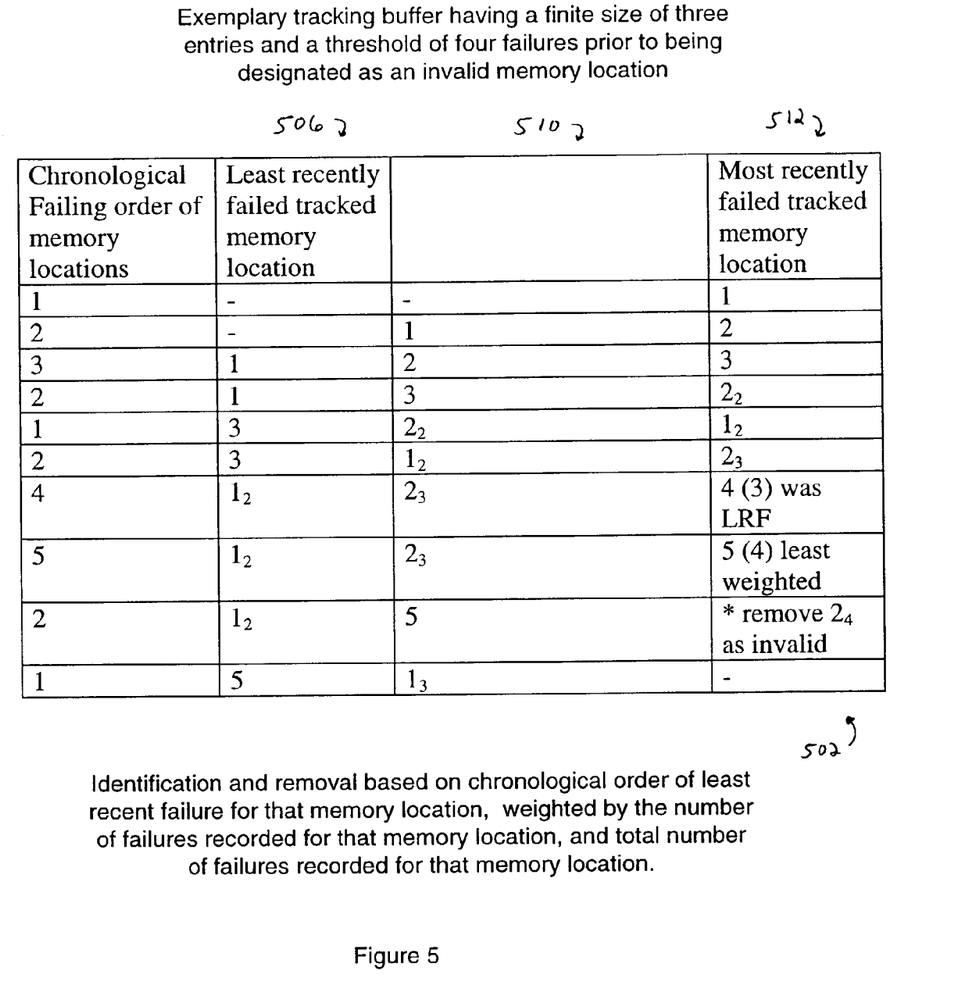
FIG. 5 illustrates a diagram of an exemplary replacement policy that identifies a memory location as a candidate for invalidation based on exceeding a threshold limit of total number of data transfer failures recorded for that memory location and adjusts removal of a particular candidate from being tracked by 1) the total number of data transfer failures associated with each tracked memory location as well as 2) the chronological order of that failure.
Figure 6:
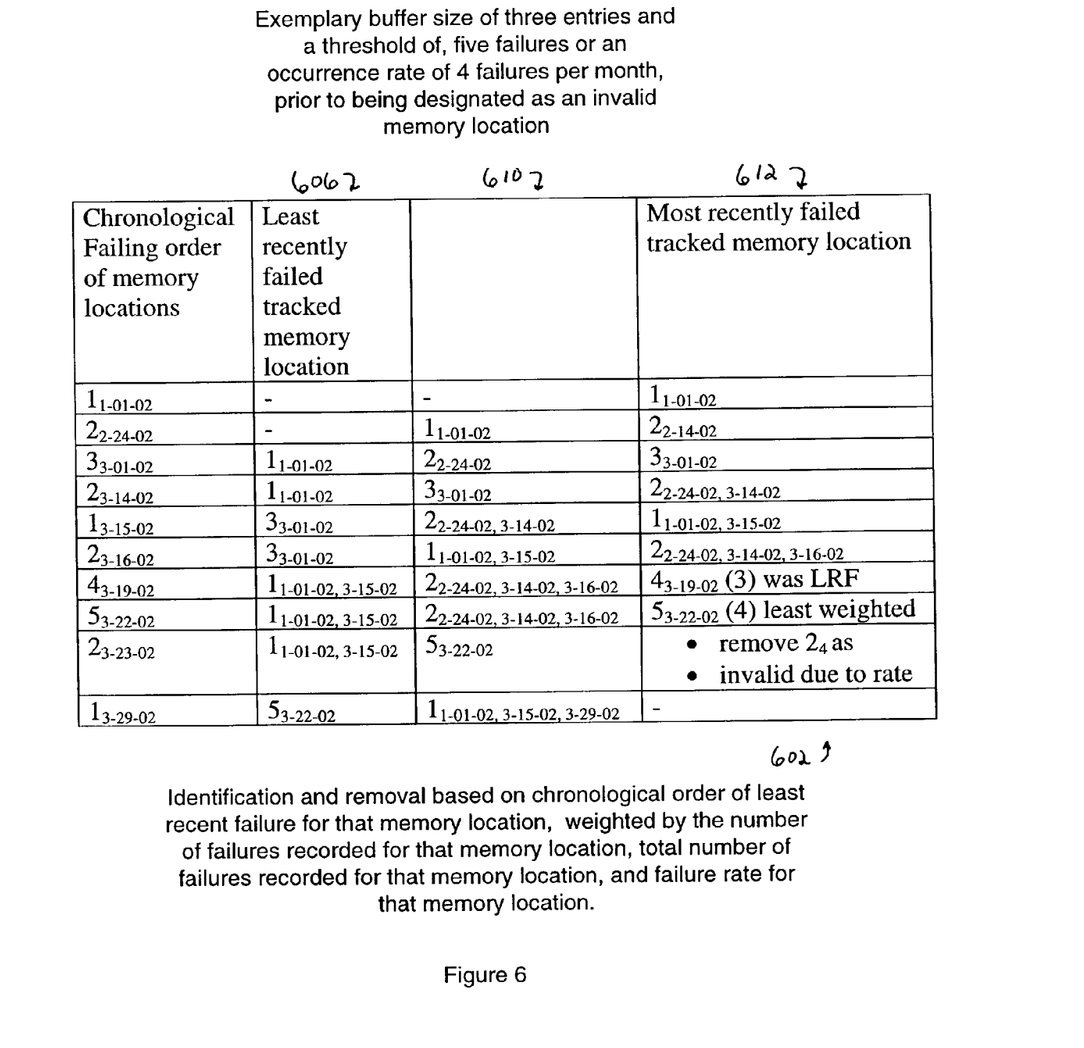
FIG. 6 illustrates a diagram of an exemplary buffer for having a finite size of three entries cooperating with an agent employing a least recently failed replacement policy that also considers the rate of data transfer failures recorded for that memory location when identifying a candidate for invalidation or removal.

Note, FIGS. 4, 5, and 6 have the same chronological order of memory locations incurring a data transfer failure. The exemplary chronological order of the memory locations is number 1 followed by numbers 2, 3, 2 again, 1 again, 2 yet again, 4, 5, 2 yet again, and 1 yet again. However, the identification of a candidate for invalidation and the removal of memory locations from being tracked differs for each replacement algorithm.

FIG. 4 illustrates a diagram of an exemplary tracking buffer cooperating with an agent using an exemplary Least Recently Failed replacement policy to identify a memory location candidate for invalidation of that memory location. The exemplary tracking buffer 402 has a finite size of three entries ranked in order from the least recently failed tracked memory location 406 to the most recently failed tracked memory location 412. The replacement policy has a threshold of four failures prior to identifying a memory location as being invalid. The replacement policy identifies and removes memory locations based on the chronological order of the least recent failure for a particular memory location as well as the total number of failures recorded for that memory location.

The exemplary chronological failing order of memory locations begins for this regime of operation. Memory location number 1 incurs a data transfer failure. The tracking buffer 402 stores the data transfer failure in the entry for the most recently failed tracked memory location 412.

The second memory location incurs a data transfer operation failure. The tracking buffer 402 then stores the failure for the second memory location in the most recently failed tracked memory entry 412 and shifts the failure associated with the first memory location in the next entry down 410. When a third memory location experiences a failure, then the third memory location failure is stacked on top of the second and first failed memory locations.

When a second failure is recorded for the second memory location, the chronological order shifts in the tracking buffer 402. The tracking buffer 402 stores the second memory location in the most recently failed entry 412, the third memory location in the next entry 410, and then the first memory location in the least recently failed entry 406. Next, the first memory location incurs a second a data transfer operation failure. The tracking buffer 402 stores the first memory location in the most recently failed tracked entry 412. The second memory location is shifted down to the next entry 410 as well as the third memory location. The third memory location occupies the least recently failed track memory location 406.

Next, when the fourth memory location experiences a data transfer operation, then the following happens. The tracking buffer 402 has a finite size of three entries 406–412. Four separate memory locations have experienced a data transfer failure. The replacement policy removes a tracked memory location from the least recently failed entry 406. The third memory location is stored in the least recently failed tracked entry 406. The agent directs the buffer 402 to clear the information on the third memory location.

Thus, since the fourth memory location incurred chronologically the most recent failure, the address for the fourth memory location is stored now in the most recently failed tracked memory location 412. Correspondingly, the second memory address is shifted down to the next entry 410. Similarly, the first memory address location is shifted below the second memory address location to the least recently failed entry 406.

Next, when the fifth memory address incurs a data transfer failure, then the address for the fifth memory location is stored in the most recently failed entry 412. The fourth is shifted down and the second memory address location is shifted into the least recently failed entry 406. The first memory address location and its two recorded failures are flushed.

The second memory address location has incurred three failures so far. If the second memory address location incurs another data transfer failure, then the second memory address location is identified as a candidate to be designated as an invalid memory location. The second memory location has incurred four failures and has met the threshold criteria to be identified as an invalid memory location. Once the second memory location has been identified as a candidate to be invalidated, the information in the entry associated with the second memory location is then removed from being tracked from the buffer 402. The tracking buffer 402 is now tracking two memory locations, which is less than the buffer's finite amount of entries.

Thus, when the next memory location incurs data transfer operation failure, for example, in memory location 1, then memory location 1 will be stored in the most recently failed tracked memory location 412. The address for the fifth memory location remains stored in the second entry 410 of the buffer 402. Similarly, the address for the fourth memory location remains stored in the third entry of the buffer 402, which is also the least recently failed tracked memory location 406.

This exemplary replacement algorithm uses a Least Recently Failed (LRF) policy for tracking failing memory location. The information on each tracked memory location is kept in the finite tracking buffer 402 during a regime of operation or over multiple regimes of operation. A memory location with an entry in the buffer 402 has failed the Least Recently or is considered 'Least Recently Failed' if the latest data transfer failure of that memory location occurred chronologically earlier than the latest data transfer failure of every memory location that has an entry in the buffer 402.

Once the total number of memory location that incurred data transfer failures exceeds the number of entries 406–412 in the buffer 402 tracking this information, the Least Recently Failed policy is used to replace the entry in the buffer 402 corresponding to the memory location that had a failure least recently among all tracked failed memory locations. This allows tracking of 'n' most recently failed memory locations where 'n', is a positive integer greater than zero.

Once a memory location fails multiple times exceeding a specified threshold, then the memory location would be permanently invalidated for that regime of operation and/or for all future regimes of operation. At the time of such an action, the tracking buffer 402 flushes information corresponding to that memory location from the entry. This least recently failed replacement algorithm, therefore, requires that knowledge of the chronological order of the failures be maintained either explicitly or implicitly in each entry. This can be done either by reordering the positions of the entries 406–412 every time there is a replacement to guarantee a chronological order, using extra fields to maintain that order, or using any other means in which the chronological order can be determined.

If there is a data transfer failure with a memory location that already has a corresponding entry in the tracking buffer 402, there is no need to replace any entry. However, the chronological order of entries or chronological ordering information associated with this entry is to be recomputed and updated to reflect that the newest entry that is under consideration is the most recent one then.

This method allows failures due to soft-errors to be corrected, monitored and subsequently discarded when they do not manifest on the same memory location in a repeated fashion. Likewise, hard errors, which may be corrected, are also monitored, and if they result in data transfer failures multiple times, then the corresponding entries are preserved till those memory locations are invalidated or till they are replaced by an entry due to a new failure. However, for a finite buffer 402 size of 'n' only the most recent 'n' failures can be tracked. Since distinguishing a soft-error based failure and a hard failure is generally done heuristically using some empirical methods (like reading failing lines or words repeatedly or writing and reading such lines or words multiple times to observe failures), the buffer 402 need not necessarily label failures as due to soft-errors or hard-defects.

An exemplary pseudo code for an implementation of an exemplary Least Recently Failed replacement policy is described below. The pseudo code is expressed in a C like language pseudo code. The actual implementation could utilize any programming language or could be completely implemented in hardware.

```
{ /* BEGIN */
On PowerOn: Clear TrackingBuffer;
If (TrackingBuffer image from previous operation available from storage)
  then load it;
While (System is running) {
    If (a Read access from a Memory location starting at an Address A
  results in a failure by producing incorrect data) then
        If (that address A exists in TrackingBuffer) then {
            Increment the FailureCount associated with the entry with
  address A;
            If (the new FailureCount exceeds a pre-determined threshold
  value) then {
  Mark that line or word associated with Address A for invalidation;
                Remove the Address A entry from the TrackingBuffer;
  Re-arrange the TrackingBuffer or update the chronology information such
  that all entries are in chronological order;
            }
            else {
                Re-adjust the chronological order of the entries in the
  TrackingBuffer by making the entry with address A the Most Recently
  Failed Entry (chronological order means: given any two entries it should
```

-continued

```
be possible to establish which entry was first entered into the
TrackingBuffer). This can be done in several ways 3 of which are
discussed:
        [a]Associate with each entry, a number that is unique and
which denotes the number of entries that have ever entered the
TrackingBuffer hence establishing a chronological order;
    Or    [b]Re-order the entries in the buffer so that they are in a
chronological order. Re-ordering can be done by physically swapping the
position of the entries in the buffer such that a chronological order is
established which corresponds to the positions in the buffer. Another
method of re-ordering is to swap the pointers associated with the positions
of the entries such that the entries are all in chronological order after
the swapping process.
        [c] Use a linked list to maintain and adjust the
chronological order.
        }
    }
    else { /* Failure at Address A occurred first time, resulting in a
new entry */
        if (TrackingBuffer has space for a new entry) then {
            Add the new entry to the TrackingBuffer such that it is
identified as the Most Recent Entry either implicitly or explicitly using
one
of the several methods described in the above else clause;
            Set the FailureCount for new entry to integer value 1;
        }
        else { /* the TrackingBuffer has no space for a new entry and
therefore do the following: */
            Apply the Least Recently Failed policy and delete the entry
that is deemed to have been due to a failure least recently, based on the
chronological order under maintenance;
            Replace the deleted entry with the new entry corresponding
to the latest failure which was at address A;
Update the chronological order (either implicitly or explicitly) indicating
that the latest entry is the result of the most recent failure;
            Set the FailureCount for new entry to integer value 1;
        }
    }
Periodically save the TrackingBuffer in non-volatile storage if the tracking
process needs to be maintained over multiple regimes of operation;
} /* while clause */
} /* END */
```

FIG. 5 illustrates a diagram of an exemplary replacement policy that identifies a memory location as a candidate for invalidation based on exceeding a threshold limit of total number of data transfer failures recorded for that memory location and adjusts removal of a particular candidate from being tracked by 1) the total number of data transfer failures associated with each tracked memory location as well as 2) the chronological order of that failure. The chronological order of memory locations, which incur a data transfer operation failure, is the same as the chronological order already described in FIG. 4. However, the results are significantly different, because this replacement policy not only identifies and removes memory locations based on chronological order of the least recent failure for that memory location and the total number of failures recorded for that memory location, but also the replacement policy takes into account a weighting factor by the total number of failures recorded for a given memory location prior to removing that memory location from the tracked buffer 502.

When the fourth memory location experiences a data transfer failure, then the number of memory locations experiencing a failure exceeds the number of entries 506–512 in the finite sized buffer 502. The memory address associated with memory location number 3 is removed from being tracked by the finite tracking buffer 502 as it was in FIG. 4, however, the memory address located with number 3 is removed now for a different reason. At this point, when the failure occurs for the fourth memory address, the memory location number 2 has three failures associated with it, memory location 1 has two failures associated with it, and memory location 3 only has one failure associated with that memory location. Thus, memory address 3 is removed from the tracking buffer 502 because it has the least number of failures associated with that address as well as occupies the least recently failed tracked memory location 506 position.

The fourth memory address is stored in the most recently failed tracked memory location 512. The second memory address is stored in the next failed tracked memory location 510. The three failures associated with the second memory address are noted and also stored in the buffer 502. The first memory address is stored in the least recently failed tracked memory location 506. The two failures associated with the first memory address are noted and stored in the buffer 502.

Next, the fifth memory address location experiences a data transfer failure. Even though the fourth memory address is stored in the most recently failed track memory location 512, the information in the entry associated with the fourth memory address is removed from the tracking buffer 502 because the fourth memory address has less total number of failures associated with that address than any of the other addresses being tracked. Thus, the fifth memory address is stored in the most recently failed tracked memory location 512. The first memory address is still stored in the least recently failed track memory location 506.

Next, when the second memory address incurs its fourth failure associated with that address, then the second memory address is identified as a candidate for invalidation and designated as an invalid memory location. All entries associated with the second memory address are removed from the buffer 502 when it is identified as an invalid memory location.

The exemplary Least Recently Failed adjusted by weight replacement policy may be used to track memory locations that incurred a data transfer failure. The weight adjusted replacement policy operates similarly to the algorithm described in FIG. 4 but some differences exist. Once the number of memory locations that have incurred data transfer failures exceeds the number of entries 506–512 in the tracking buffer 502, the modified Least Recently Failed policy adjusts by the failure frequency or failure count of the existing entries when selecting a memory location to be removed from being tracked by the tracking buffer 502. Note, the failure count is the number of times a memory location incurred a data transfer failure while being tracked by the tracking buffer 502.

When a data transfer failure occurs on a memory location, then if an entry for the memory location exists in the buffer 502 due to a prior failure, the agent increments the associated failure count and updates the chronological order of the entries or the chronological information for that entry. If the failure count is greater than a specific threshold total number of failures for that memory location, then the algorithm invalidates the memory location and deletes the corresponding entry from the buffer 502. In an embodiment, a failure "weight" based on error severity may be applied to increase the failure count to a greater amount for errors that have a greater severity.

If there is no space in the buffer 502 for the new entry, the agent does the following. The agent considers all entries with the smallest failure count present in the tracking buffer 502. The agent uses the weighted Least Recently Failed policy to identify the Least Recent entry in the tracking buffer 502 based on the chronological order amongst those entries with the smallest failure count. The agent replaces that identified entry with a new one corresponding to the latest failure. The agent then updates the chronological order of entries in the buffer 502.

An exemplary pseudo code for an exemplary weighted Least Recently Failed replacement policy is described below.

```
{ /* BEGIN */
On PowerOn: Clear TrackingBuffer;
If (TrackingBuffer image from previous operation available from storage)
then load it;
While (System is running) {
    If (a Read access from a Memory location starting at an Address A
results in a failure by producing incorrect data) then
        If (that address A exists in TrackingBuffer) then {
            Increment the FailureCount associated with the entry with
address A;
            If (the new FailureCount exceeds a pre-determined threshold
value) then {
Mark that line or word associated with Address A for invalidation;
                Remove the Address A entry from the TrackingBuffer;
                Re-arrange the TrackingBuffer or update the chronology
information such that all entries are in chronological order;
            }
            else {
                Re-adjust the chronological order of the entries in the
TrackingBuffer by making the entry with address A the Most Recently
Failed Entry (chronological order means: given any two entries it should
be possible to establish which entry was first entered into the
TrackingBuffer). This can be done in several ways 3 of which are
discussed:
                [a]Associate with each entry, a number that is unique and
which denotes the number of entries that have ever entered the
TrackingBuffer hence establishing a chronological order;
                Or      [b]Re-order the entries in the buffer so that they are in a
chronological order. Re-ordering can be done by physically swapping the
position of the entries in the buffer such that a chronological order is
established which corresponds to the positions in the buffer. Another
method of re-ordering is to swap the pointers associated with the positions
of the entries such that the entries are all in chronological order after the
swapping process.
                [c] Use a linked list to maintain and adjust the
chronological order.
            }
        }
        else { /* Failure at Address A occurred first time, resulting in a
new entry */
            if (TrackingBuffer has space for a new entry) then {
                Add the new entry to the TrackingBuffer such that it is
identified as the Most Recent Entry either implicitly or explicitly using
one
of the several methods described in the above else clause;
                Set the FailureCount for new entry to integer value 1;
            }
            else { /* the TrackingBuffer has no space for a new entry and
therefore do the following: */
                Consider the subset S of entries in the TrackingBuffer with
the smallest FailureCount;
Apply the Least Recently Failed policy and delete from the above subset
S, the entry that is deemed to have been due to a failure least recently,
based on the chronological order under maintenance;
                Replace the deleted entry with the new entry corresponding
to the latest failure which was at address A;
                Update the chronological order (either implicitly or
explicitly) indicating that the latest entry is the result of the most recent
failure;
                Set the FailureCount for new entry to integer value 1;
            }
        }
Periodically save the TrackingBuffer in non-volatile storage if the tracking
process needs to be maintained over multiple regimes of operation;
} /* while clause */
} /* END */
```

FIG. 6 illustrates a diagram of an exemplary buffer having a finite size of three entries cooperating with an agent employing a least recently failed replacement policy that also considers the rate of data transfer failures recorded for that memory location when identifying a candidate for invalidation or removal. The chronological failing order of the memory locations is the same as occurred in FIG. 4 and FIG. 5. The replacement policy identifies and removes memory locations based on the chronological order of the least recent failure for the memory locations being tracked, weighted by the total number of failures recorded for each memory location being tracked, and the failure rate for each memory location being tracked.

In this example, a threshold has been set in the replacement policy of five failures total or an occurrence rate of four failures per month to be identified as an invalid memory location. A time stamp is associated with each failure and stored in one of the fields of the tracking buffer 602 for each memory location and for each failure.

When the fourth memory location experiences a data transfer operation failure, then similar to FIG. 5, the memory address location number 3 is removed from being tracked. Memory address location number 3 is removed because the third memory location was the least recently failed tracked entry 606 and that memory location had the least number of failures associated with that memory location.

The replacement and ordering operations are similar to the replacement policy in FIG. 5 until the second memory address location experiences its fourth failure. Since the failure threshold has been raised to five failures, the second memory location is not removed from being tracked from the tracking buffer 602 because it only suffered four failures, not five. However, the first failure associated with the second memory address location occurred on Feb. 24, 2002 and the fourth failure occurred less than a month later on Mar. 23, 2002. Thus, the second memory address location is removed from being tracked from the tracking buffer 602 and identified as an invalid memory location because it has exceeded the threshold occurrence rate of four failures per month.

When a data transfer failure occurs on a memory location, the algorithm searches the tracking buffer to determine if an entry for the memory location causing the error exists in the buffer due to a prior failure. If the address of the memory location is not already stored, an entry is created for the memory location. The entry contains a failure count of one (1) and a time stamp value indicating the time of detection of the first error. If an entry is found for the current memory location experiencing a failure, then the error count is incremented and further processing is performed using the current time and the stored time from the first error to compute the frequency of the errors, or the error rate for a given memory location.

The memory location is identified as a candidate for invalidation if either of two failure criteria is met. The two failure criteria are 1) the failure frequency rate is at or above the pre-defined threshold, or 2) the total number of failures is at or above the pre-defined threshold. The thresholds for the failure rate may be determined by statistical analysis or some other suitable method such that there is a high degree of confidence that when the memory location that exceeds these thresholds it is indeed the cause of the mal-functioning and needs to be invalidated.

In an embodiment, the algorithm may also decrement error counts for memory location that have not experienced a new error for a set amount of time. If the error count for a memory location becomes zero after decrementing, the record for the memory location will be removed from the tracking buffer. If the error count is still non-zero after decrementing, the time stamp for the entry will be updated based on the current frequency of errors for that memory location and the current time.

In an embodiment, the finite buffer size could be determined such that there is a high confidence that the buffer will never overflow for a given implementation by using the statistical failure rate for the device. However, if the buffer does become full, the next error will cause the removal of a memory location having previous error to allow room for the memory location with the new error. The memory location removed will be the line with the lowest frequency of errors.

An exemplary pseudo code for an exemplary time-stamped Least Recently Failed replacement policy is described below.

```
{ /* BEGIN */
// Upon Error Detection, the following routine is called.
// errorRecord is a structure containing the information for each entry in the tracking
// buffer, the exact implementation is dependent upon details of the device
// being tracked
struct errorRecord {
    int lineAddress;
    int timestamp;
    int errorCount; // set to -1 if errorRecord is not in use
}
#define MAX_FREQUENCY_THRESHOLD          X     // X is implementation dependent
#define MAX_ERROR_THRESHOLD              Y     // Y is implementation dependent
#define THRESHOLD_TO_REDUCE_ERROR_COUNT  Z     // Z is implementation dependent
#define MAX_BUFFER_SIZE                  XX    // XX is implementation dependent
errorRecord    Buffer[MAX_BUFFER_SIZE];        // Buffer is the tracking buffer
int max ValidRecord;                           // contains # of highest valid record in buffer
UpdateError(void)
{
    // pBuffer is a pointer to an errorRecord
    errorRecord   *pBuffer;
    int count;
    // readHardwareLog is implementation dependent and returns the address of the line
    // reporting the error
    Address = readHardwareLog( );
    // determine if line reporting error is already being tracked
    pBuffer = Buffer[0];
    int presentFlag = 0;
    for (count=0; count++, count < max ValidRecord)
    {
if (pBuffer->lineAddress == Address)
{
    presentFlag = 1;
    break;                        // break out of for loop
}
pBuffer++;
    }
    if (presentFlag)
    {
        pBuffer->errorCount += 1; // increment error count
        int frequency = (CurrentTime - pBuffer->timestamp) / pBuffer->errorCount;
        if ((pBuffer->errorCount > MAX_ERROR_THRESHOLD) ||
(frequency > MAX_FREQUENCY_THRESHOLD))
            DisableLine(Address);     // disable call is implementation dependent
    }
    else
    {
        if (max ValidRecord == MAX_BUFFER_SIZE)
        {
            FreeBufferEntry( );                    // implementation not shown
            Max ValidRecord--;
        }
        Buffer[max ValidRecord].lineAddress = Address;
        Buffer[max ValidRecord].timestamp = CurrentTime;
        Buffer[max ValidRecord].errorcount = 1;
        Max ValidRecord++;
    }
    // decrement error counts where appropriate
    pBuffer = Buffer[0];
    int numberRemoved = 0;
    for (count=0; count++, count < max ValidRecord)
    {
if (pBuffer->lineAddress != Address) // don't decrement if just incremented
{
            int frequency = (CurrentTime - pBuffer->timestamp) / pBuffer->errorCount;
if (frequency < THRESHOLD_TO_REDUCE_ERROR_COUNT)
```

-continued

```
    {
        if (pBuffer->errorCount > 1)
            pBuffer->errorCount--;
        else
        {
            pBuffer->errorCount = -1;
            pBuffer->timestamp = 0;
            numberRemoved++;
        }
    }
}
pBuffer++;
}
if (numberRemoved > 0)
    RepackBuffer(numberRemoved); //implementation not shown
                                // moves buffer records from end to
                                // fill in holes and decrements
                                // Max ValidRecord appropriately
} /* END */
```

Figure 7:
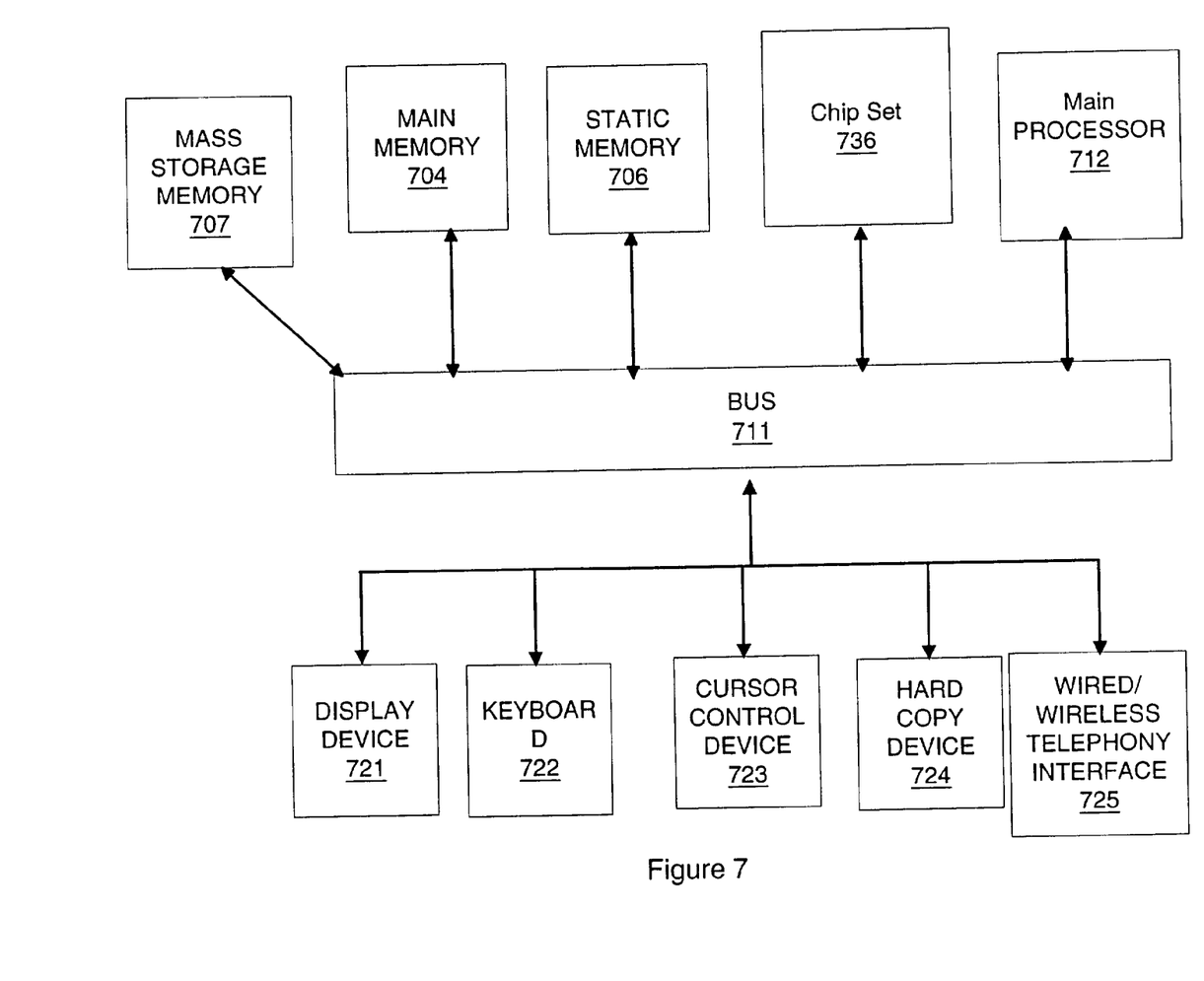
FIG. 7 illustrates an exemplary computer system that implements a tracking buffer cooperating with an agent employing a replacement policy algorithm to track one or more memory locations that have passed a built in self test however during a subsequent operation have had at least one or more data transfer failures.

FIG. 7 illustrates an exemplary computer system that implements a tracking buffer cooperating with an agent employing a replacement policy algorithm to track one or more memory locations that have passed a built in self test however during a subsequent operation have had at least one or more data transfer failures. In one embodiment, computer system 700 comprises a communication mechanism or bus 711 for communicating information, and an integrated circuit component such as a processor 712 or chipset 736 coupled with bus 711 for processing information.

Computer system 700 further comprises a random access memory (RAM), or other dynamic storage device 704 (referred to as main memory) coupled to bus 711 for storing information and instructions to be executed by processor 712. Main memory 704 also may be used for storing temporary variables or other intermediate information during execution of instructions by processor 712. In an embodiment, the Processor 712 may include a microprocessor, but is not limited to a microprocessor, such as a Pentium, PowerPC, etc.

Computer system 700 also comprises a read only memory (ROM) and/or other static storage device 706 coupled to bus 711 for storing static information and instructions for processor 712, and a mass storage memory 707, such as a magnetic disk or optical disk and its corresponding disk drive. Mass storage memory 707 is coupled to bus 711 for storing information and instructions.

In an embodiment, a memory word typically is all of the bits accessed by a given address in any memory 707, 706, 707, such as an eight-bit row in a memory array. A cache line typically located in virtually any of the system components and is comprised of two parts, data lines and a tag array. First, a data line is a collection of bits, such as eight bits, but not required to be specific to any structure such as in a sequential row. Second, a tag array contains fields with information that map to the data lines as well as provide content information about the data stored in the data lines such as State and, Replacement state.

This memory locations may be failing memory words in all volatile and non-volatile memories like SRAMs, DRAMs, magnetic memories including magnetic disk based storage, ferro-electric memories, etc. In an embodiment, MESI state bits of a cache line or a separate bit field associated with each cache line indicates a defect, thereby permanently invalidating the cache line.

Computer system 700 may further be coupled to a display device 721, such as a cathode ray tube (CRT) or liquid crystal display (LCD), coupled to bus 711 for displaying information to a computer user. An alphanumeric input device (keyboard) 722, including alphanumeric and other keys, may also be coupled to bus 711 for communicating information and command selections to processor 712. An additional user input device is cursor control device 723, such as a mouse, trackball, trackpad, stylus, or cursor direction keys, coupled to bus 711 for communicating direction information and command selections to processor 712, and for controlling cursor movement on a display device 712.

Another device that may be coupled to bus 711 is a hard copy device 724, which may be used for printing instructions, data, or other information on a medium such as paper, film, or similar types of media. Furthermore, a sound recording and playback device, such as a speaker and/or microphone (not shown) may optionally be coupled to bus 711 for audio interfacing with computer system 700. Another device that may be coupled to bus 711 is a wired/wireless communication capability 725 to communication to a phone.

In one embodiment, the software used to facilitate the algorithm can be embodied onto a machine-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; DVD's, electrical, optical, acoustical or other form of propagated signals (e.g., carrier waves, infrared signals, digital signals, EPROMs, EEPROMs, FLASH, magnetic or optical cards, or any type of media suitable for storing electronic instructions. Slower mediums could be cached to a faster, more practical, medium.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

The computing system having memory locations may also include for example local server caches, Web browser's caches, or other similar systems.

While some specific embodiments of the invention have been shown the invention is not to be limited to these embodiments. For example, the algorithm could include an algorithm different than the least frequently failed policy such as the not recently failed replacement policy. Similarly, most functions performed by electronic hardware components may be duplicated by software emulation and vice versa. Thus, a software program written to accomplish those same functions may emulate the functionality of the hardware components the computing system. Note, a subsequent operation may include a subsequent self test. The buffer size may be increased or reduced by an agent during a regime of operation. The invention is to be understood as not limited by the specific embodiments described herein, but only by scope of the appended claims.

We claim:

1. An apparatus, comprising:
a memory comprising a buffer having two or more entries, the first entry to track one or more memory locations that have passed a built in self test and during a subsequent operation have had at least one failure indicated by an error checking mechanism; and
a processor comprising an agent that uses a replacement policy algorithm and the agent also cooperates with the buffer to implement tracking of the one or more memory locations.

2. An apparatus, comprising:
a memory comprising a buffer having two or more entries, the first entry to track one or more memory locations that have passed a built in self test and during a subsequent operation have had at least one failure indicated by an error checking mechanism; and
a processor comprising an agent that uses a replacement policy algorithm and the agent also cooperates with the buffer to implement tracking of the one or more memory locations, the replacement algorithm comprises a Least Recently Failed replacement policy to identify a memory location candidate for invalidation.

3. The apparatus of claim 2, wherein the identification of the memory location candidate by the Least Recently Failed replacement policy is based, at a least in part, by a rate of data transfer failure for each tracked memory location.

4. The apparatus of claim 2, wherein the identification of the memory location candidate by the Least Recently Failed replacement policy is based, at least in part, by a total number of data transfer failures associated with each tracked memory location.

5. The apparatus of claim 4, wherein the data transfer failure comprises an incorrect data result from a read operation.

6. The apparatus of claim 4, wherein the data transfer failures comprises an incorrect data result that deviates from an unexpected outcome and is detected by an error checking mechanism.

7. The apparatus of claim 1, wherein the buffer has a finite amount of entries and the replacement algorithm removes information associated with a tracked memory location from the buffer when the total number of tracked memory locations exceed the finite number of entries in the buffer.

8. The apparatus of claim 7, wherein the agent further includes a comparator to compare when the number of recorded failures exceeds a threshold.

9. An apparatus, comprising:
a memory having:
means for tracking one or more data transfer failures associated with a memory location that has passed a built in self test and during a subsequent operation has had at least one data transfer failure; and
means for detecting the data transfer failure with an error detection checking mechanism; and
a processor having:
means for determining whether to invalidate the memory location based upon a Least Recently Failed replacement policy to identify a memory location candidate for invalidation.

10. The apparatus of claim 9, wherein the processor further comprises:
means for determining with the replacement policy when a number of data transfer failures for that memory location equals or exceeds a threshold total number of data transfer failure.

11. The apparatus of claim 9, wherein the processor further comprises:
means for determining with the replacement policy when a rate of data transfer failures for that memory location equals or exceeds a threshold number of data transfer failures.

12. A machine readable storage medium having instructions, which when executed by the machine, cause the machine to perform operations comprising:
tracking one or more data transfer failures associated with a memory location that has passed a built in self test and during a subsequent operation has had at least one data transfer failure; and
detecting the data transfer failure with an error detection checking mechanism; and
determining whether to invalidate the memory location based upon a Least Recently Failed replacement policy to identify a memory location candidate for invalidation.

13. The machine readable storage medium of claim 12, wherein the instructions, when executed, further cause the machine to perform operations comprising:
determining with the replacement policy when a total number of data transfer failures for that memory location equals or exceeds a threshold number of data transfer failures.

14. The machine readable storage medium of claim 12, wherein the instructions, when executed, further cause the machine to perform operations comprising:
  determining with the replacement policy when a rate of data transfer failures for that memory location exceeds a threshold number of data transfer failures.

15. The machine readable storage medium of claim 12, wherein the instructions, when executed, further cause the machine to perform operations comprising:
  tracking a plurality of memory locations that have each incurred one or more data transfer failures;
  determining with the replacement policy which tracked memory location has the least recent failure in chronological order of all the memory locations being tracked; and
  removing information associated with that tracked memory location from being tracked, if total number of tracked memory locations exceeds a finite number of tracked memory locations.

16. A computer system, comprising:
  an agent to use a replacement policy algorithm to implement tracking of one or more memory locations;
  a memory having the one or more memory locations; and
  a buffer having two or more entries, a first entry to track the one or more memory locations that have passed a built in self test however during a subsequent operation have had at least one failure indicated by an error checking mechanism, wherein the agent cooperates with the buffer to implement tracking of the one or more memory locations.

17. The apparatus of claim 16, wherein at least one of the memory locations comprises a memory word.

18. The apparatus of claim 16, wherein at least one of the memory locations comprises a cache line.

* * * * *